United States Patent
Ansell et al.

(10) Patent No.: US 12,523,331 B2
(45) Date of Patent: Jan. 13, 2026

(54) END STOP FOR A FIBRE OPTIC CABLE TUBE

(71) Applicant: RELIANCE WORLDWIDE CORPORATION (UK) LIMITED, West Drayton (GB)

(72) Inventors: Glen Ansell, West Drayton (GB); Joshua Smith, West Drayton (GB)

(73) Assignee: Reliance Worldwide Corporation (UK) Limited, Middlesex (GB)

(*) Notice: Subject to any disclaimer, the term of this patent is extended or adjusted under 35 U.S.C. 154(b) by 437 days.

(21) Appl. No.: 18/260,666

(22) PCT Filed: Dec. 21, 2021

(86) PCT No.: PCT/EP2021/087109
§ 371 (c)(1),
(2) Date: Jul. 7, 2023

(87) PCT Pub. No.: WO2022/148646
PCT Pub. Date: Jul. 14, 2022

(65) Prior Publication Data
US 2024/0060590 A1    Feb. 22, 2024

(30) Foreign Application Priority Data
Jan. 8, 2021   (GB) .................. 2100239

(51) Int. Cl.
*F16L 37/10* (2006.01)
*F16L 55/115* (2006.01)
*G02B 6/44* (2006.01)

(52) U.S. Cl.
CPC ........ *F16L 55/115* (2013.01); *G02B 6/44775* (2023.05)

(58) Field of Classification Search
CPC ... F16L 55/115; F16L 37/0985; F16L 37/098; G02B 6/44775; G02B 6/3849; G02B 6/4439; G02B 6/38; G02B 6/44
See application file for complete search history.

(56) References Cited

U.S. PATENT DOCUMENTS

| | | | |
|---|---|---|---|
| 2013/0257043 A1* | 10/2013 | Guest | F16L 37/101 285/322 |
| 2021/0131596 A1* | 5/2021 | Mitrovic | F16L 33/225 |
| 2022/0112974 A1* | 4/2022 | Ansell | G02B 6/4459 |

FOREIGN PATENT DOCUMENTS

| | | |
|---|---|---|
| GB | 2294306 A | 4/1996 |
| GB | 2570296 A | 7/2019 |

(Continued)

OTHER PUBLICATIONS

CAMOZZI; FTTx Passive components for telecoms applications catalogue; 2020; pp. 1-12; downloaded from https://us.automation.camozzi.com/kdocs/1989983/ca-fttx_2020_eng_lowres.pdf; accessed Jul. 3, 2023.

(Continued)

*Primary Examiner* — Amy J. Sterling
(74) *Attorney, Agent, or Firm* — Barnes & Thornburg LLP (57) ABSTRACT

An end stop for a fibre optic cable tube which is open at one end and closed at the opposite end. A connector at one end connects to a respective tube. An annular wall extends from the closed end and is spaced radially inwardly from the outer wall of the housing defining an air gap. An inner face of the annular wall receives the tube. The annular wall and housing may be transparent. The connector may be a collet within the housing which engages on a cam feature in the housing.

20 Claims, 8 Drawing Sheets

(56) References Cited

FOREIGN PATENT DOCUMENTS

| WO | 2020036637 A1 | 2/2020 |
| WO | 2021005100 A1 | 1/2021 |
| WO | 2021005319 A1 | 1/2021 |

OTHER PUBLICATIONS

Search Report; Patent Application No. GB2100239.9; Oct. 12, 2021.
Search Report and Written Opinion; Patent Application No. PCT/EP2021/087109; Apr. 5, 2022.

* cited by examiner

END STOP FOR A FIBRE OPTIC CABLE TUBE

PRIORITY CLAIM

This patent application is a U.S. National Phase of copending International Patent Application No. PCT/EP2021/087109, filed Dec. 21, 2021, which claims priority to British Patent Application No. 2100239.9, filed Jan. 8, 2021, the disclosures of which are incorporated herein by reference in their entirety.

FIELD

The present disclosure relates to an end stop for a fibre optic cable tube.

BACKGROUND

Such end stops are used at the end of a run of tubes through which a fibre optic cable is subsequently passed. A number of tubes are connected end to end by a plurality of connectors. The end stops are fitted on the ends of the outermost tubes in the line. They are fitted in place when the tubes are laid in place and then buried. Sometime later, possibly around a year, the ends of the tubes are dug up and the end stops are removed to allow the fibre optic cables to be run through Known end stops provide an end stop which has a plastic housing which is moulded with a number of ribs in order to enhance the rigidity of the end stop. The end stop is open at one end which is provided with a collet in order to grip the end of the tube. Between the end of the housing and an outer lip on the collet a C shaped clip can be fitted thereby preventing axial movement between the collet and the housing to prevent the collet from being able to move to release the tube thereby ensuring it remains locked in place.

At the opposite, closed, end of the housing is a transparent section in which the distal end of the tube is received. The transparency of the end section means that the end of tube is visible in its final position. At this point, the diameter of the end stop is significantly narrower than the diameter of the remainder of the housing which must accommodate other components such as the collet or grab ring, a cartridge which provides a surface against which the collet deflects, and an annular sealing ring.

These end stops suffer from a number of drawbacks as set out below.

At the closed end of the end stop, the reduced diameter portion means that the end of the tube is retained directly against the outer wall of the housing. As set out above, this is done so that there is good visibility of the end of the tube allowing a user to verify that the tube has been correctly located. However, this leaves the end of the tube vulnerable to damage should an impact occur on the end stop in this region. Any such impact would be transmitted directly to the tube potentially causing it to deflect inwardly thereby spoiling the integrity of the annular seal with the outer wall of the tube.

Further problems are caused by the presence of ribs which trap dirt on the housing thereby making it difficult for maintenance personnel to be able to see whether the tube is correctly in place. Similarly, the C shaped clip at the lip of the collet which is above the housing also provide sites in which dirt can accumulate thereby potentially compromising the locking mechanism.

SUMMARY

The present disclosure is directed to improving the design of the end stop to solve one or more of the above problems.

According to the present disclosure, there is provided a collet locking ring according to claim 1.

The presence of the annular wall at the closed end which is spaced from the outer wall of the housing serves to protect the end of the tube from deflection caused by an impact on the housing wall. If an impact occurs which deflects the outer wall of the housing inwardly, this will not cause the annular wall, and hence the wall of the tube, to be deflected unless the impact is large enough to close the air gap between the wall of the housing and the annular wall and then to causing the deflection of the annular wall. In practice, the gap between the walls can be engineered such that this would not happen in the majority of the types of impact which can be expected.

In co-owned WO2021/005100, which is incorporated by reference herein as if set forth in its entirety we disclose a fibre optic cable connector which has an inner sleeve to receive the ends of the tube. This is supported against the outer housing by small, discrete webs of material in order to reduce the effect of the impact on the inner sleeve.

The present disclosure takes a different approach in that the annular wall is supported at the closed end of the end stop, rather than by discrete webs. This provides a more stable support for the annular wall. Further, it is based on the recognition that an impact on the end face of a connector is not likely to cause the type of inward deflection of the tube which might affect the integrity of the seal. By eliminating the discrete webs, the end stop eliminates a potential direct load path from outside of the end stop directly to the annular wall whilst providing a more stable support for the end of the tube.

The annular wall and the housing at the closed end may be opaque, but are optionally transparent such that the presence of a tube seated within the annular wall can be seen externally of the housing.

The connector may be a grab ring. This has a plurality of inwardly angled flexible teeth which grip an inserted tube. Any force tending to pull the tube out of the connector causes the teeth to deflect thereby increasing the gripping force on the tube. However, optionally the connector is a collet located in the open end of the housing and having a ring and a plurality of flexible arms extending generally axially of the ring into the housing, the housing having a tapered surface convergent towards the open end and the collet arms having heads at their distal ends for engaging both of the tapered surface and a tube extending, in use, through the collet into the housing to be compressed against the tube by the tapered surface with outward movement of the collet with respect of the housing to secure the tube in the throughway.

Optionally the end stop further comprises a collet lock formed on the collet, the collet having a locked rotary position in which the lock holds the collet in an outward tube securing position and an unlocked rotary position in which the collet can move axially with respect to the throughway for release and engagement of a tube by the collet; wherein one of the housing and the collet is provided with a cam surface and the other of the housing and the collet is provided with a cam follower, the cam surface being provided to provide the locked and unlocked positions.

This type of is collet is used in a single diameter connector disclosed in co-owned WO2021/005319 which is incorporated by reference herein as if set forth in its entirety.

Instead of the separate locking clip of the prior art, this uses a locking mechanism which is integrated into the end stop. This is much simpler to operate as there is no additional component which is relatively difficult to manipulate and easy to lose in the dirty environment of the trench. The clip is also exposed to the dirt in the trench and can therefore be difficult to unlock should this be needed.

Because the locking is done by the interaction between the housing and the collet, the locking mechanism can effectively be internal to the housing. This can provide a low profile design and also protect the locking mechanism from impact damage and from the ingress of dirt.

The cam surface can be provided either on the housing or the collet, but is optionally on the housing. In this case, the cam surface can be moulded directly into the housing as part of the housing moulding process. However, this requires relatively complex tooling. Optionally, therefore, the housing includes a cartridge retained by a main housing portion, the cartridge being provided with the cam surface. The cartridge may be fitted over or within the main housing portion. It may be retained by teeth which grip the main housing portion, ultrasonic welding, a snap fit, a screw fit, or in any other way.

With the prior art fibre end stops, it is necessary for the collet to protrude beyond the housing to allow an annular gap in which the locking clip is inserted. This is not necessary in the present disclosure. The collet ring can still protrude axially beyond the housing, but, optionally, in the locked position, the collet ring does not protrude axially beyond the housing. It may be flush with the housing, but is optionally recessed into the housing. This protects the collet ring from impact damage and from dirt.

Optionally the connector is devoid of outer ribs and/or has a continuous outer surface of constant radius. This eliminates the ribs which are provided on prior art connectors but which provide stress concentrators and regions in which dirt can accumulate. The outer surface of constant radius also has a synergy with the requirement for the annular wall as this is an inner diameter which corresponds to the inner diameter of the collet. In the present disclosure the outer surface of the constant radius provides a space which can accommodate the annular wall which is spaced from the outer wall of the housing.

BRIEF DESCRIPTION OF THE DRAWINGS

An example of an end stop in accordance with the present disclosure will now be described with reference to the accompanying drawings, in which.

DETAILED DESCRIPTION

The end stop connector is intended to be fitted to the end of the fibre optic cable tube. In practice, a number of tubes are connected end to end in order to receive a bundle of optical fibres. At each end of the run of tubes, the free end of the tube needs to be sealed off to prevent dirt and water from entering at the end of the tube. The tubes are buried for some time before the fibre optic cables are installed. At this time the ends of the tubes are dug up, the end stops are removed and the fibres inserted into the open end of the tube and blown along the tubes.

It is therefore important that the end stop is able to provide a reliable seal on to the outer surface of the tube. It is also important that the end stop is resilient in that it can be subjected to significant impacts during the installation process which involves digging up the ground in order to accommodate the tubes and then filling in above the tubes with earth, rocks etc.

It is also useful for a maintenance engineer to be able to inspect the integrity of the end stop without having to remove it. In particular, it is useful to be able to determine firstly that the end of the tube is correctly located and secondly that there is no obvious damage which may have disturbed the integrity of the seal.

The end stop is made up of four main components, namely housing 1, cartridge 2, collet 3 and seal 4.

Figure 3:
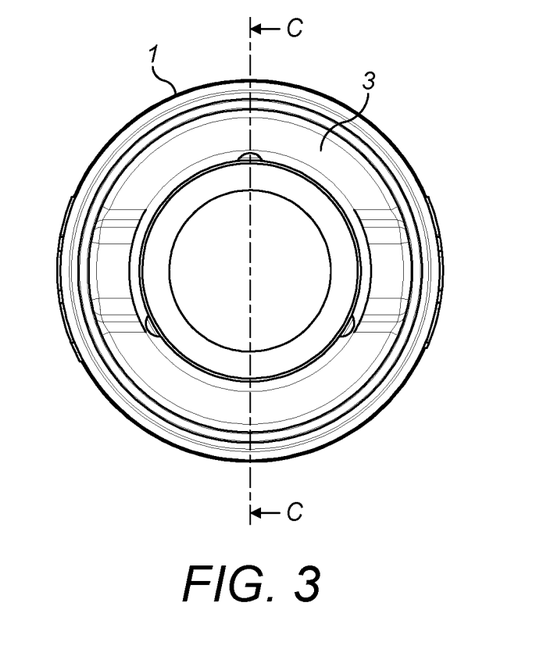
FIG. 3 is an end view of the end stop and tube from one end.
Figure 3A:
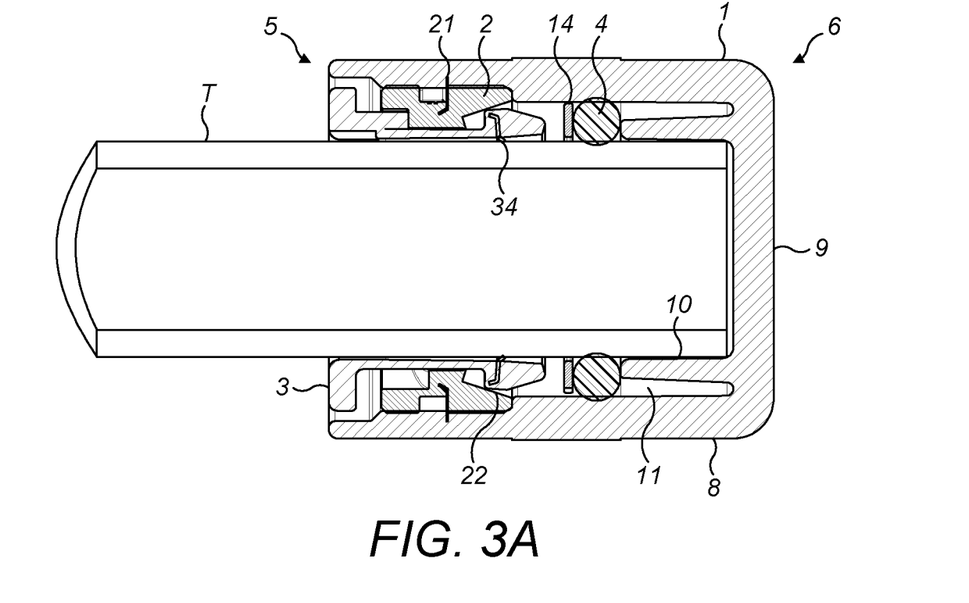
FIG. 3A is a cross section through line A-A in FIG. 3.
Figure 4:
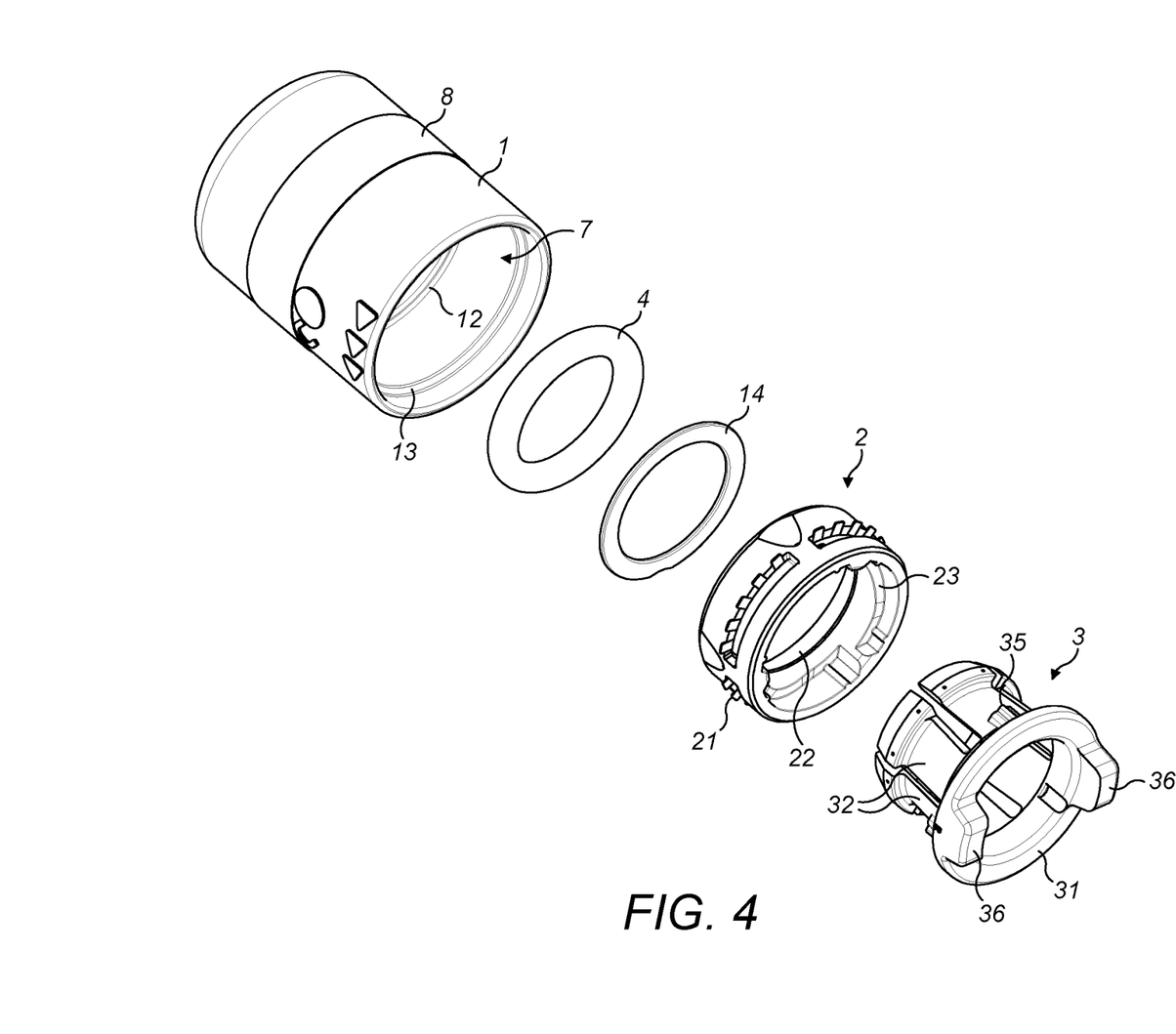
FIG. 4 is an exploded perspective view of the end stop from one end.

The housing 1 is a hollow cylinder which is open at one end 5 and closed at the opposite end 6 creating an internal cavity 7. The housing 1 comprises a cylindrical side wall 8 and a circular end wall 9. An annular wall 10 protrudes axially from the end wall 9 part way towards the open end 5 that is spaced from the side wall 8 creating an annular air gap 11. The tube T is received within the annular wall 10 (FIG. 3A).

During the installation process, any impact on the housing 1, for example, from a tool or from the material in which the housing is buried may impact on the outer wall of the housing 1. If the impact is relatively large, this may cause inward deflection of the housing wall 1. However, this will simply deflect into the air gap 11 such that it will not (other than in very extreme cases) cause any inward deflection of the tube T in a manner which might disturb the integrity of the seal 4.

As well as providing enhanced impact protection, the air gap 11 provides additional benefits. Without it, the wall of the housing surrounding the tube would be significantly thicker to preserve the constant external radius of the housing. A thick part will cool unevenly leading to clouding of the plastic material and loss of transparency. The thicker material is also stiffer and is therefore more prone to cracking and therefore creating leakage paths under impact, as opposed to the above described arrangement which can deflect more readily. The air gap therefore contributes to enhanced transparency and better resiliency of the housing.

The side wall 1 is provided with a first internal annular shoulder 12 to receive the cartridge 2 and a second annular shoulder 13 adjacent to the open end to receive the collet 3. The seal 4 is received on the end of the annular wall 10 and is held in place by a washer 14.

The housing 1 is formed of a transparent material providing a clear optical path from outside of the housing into the region within the annular wall 10 to allow visual confirmation that the end of the tube has reached the end wall 9. The seal 4 is also visible from outside of the end stop.

The cartridge 2 and collet 3 together form a connector at the open end 5 of the end stop.

The cartridge 2 has a generally annular configuration. The outer surface is provided with a plurality of flexible metal teeth 21. The cartridge 2 is inserted into an end of the housing 1 until it seats against the first shoulder 12. The teeth 21 grip the wall of the housing 1 to ensure that the cartridge 2 is permanently retained in the housing 1. At the end of the cartridge 2 adjacent to the first shoulder 12, there is a tapered cam surface 22 which cooperates with the collet as described below. At the opposite end, the end face of the cartridge 2 is provided with a number of ramped surfaces 23. Although three such surfaces are shown, there may be any suitable number. Each ramp surface has a low point 24 corresponding to an unlocked configuration and a high point 25 corresponding to a locked configuration within an inclined face 26 in between (see FIG. 5A). Bumps 27 are provided at the interface between the high point 25 and the inclined face 26 and between the inclined face 26 and the low point 24. The low point 24 terminates at a first end stop 28 and the high point 25 terminates at a second end stop 29.

Most of the features of the collet 3 are conventional. It has a collet ring 31 from which a plurality of flexible arms 32 extend. Each arm has a head 33 at its distal end as is provided with an inwardly projected metal tooth 34.

With a tube T inserted, any movement tending to pull the tube T out of the connector causes the teeth 34 to grip into the tube, this pulls the heads 33 towards the tapered cam surface 22 on the cartridge 2 deflecting the arms 32 inwardly to provide a progressively increasing gripping force on the tube T. This serves to hold the tube T securely in place. This is the conventional manner in which a collet operates.

The collet 3 has three cam followers 35 extending from the collet ring 31 towards the ramped surface 23 on the cartridge 2. Although three followers 35 are shown, in practice there are as many followers 35 as there are ramped surfaces 23. Alternatively, the cam arrangement may be inverted such that the ramped surface(s) is/are on the collet and the follower(s) is/are on the cartridge.

The collet ring 31 is also provided with a pair of tabs 36 which extend from the collet ring 31 the opposite direction to the followers 35.

Figure 5:
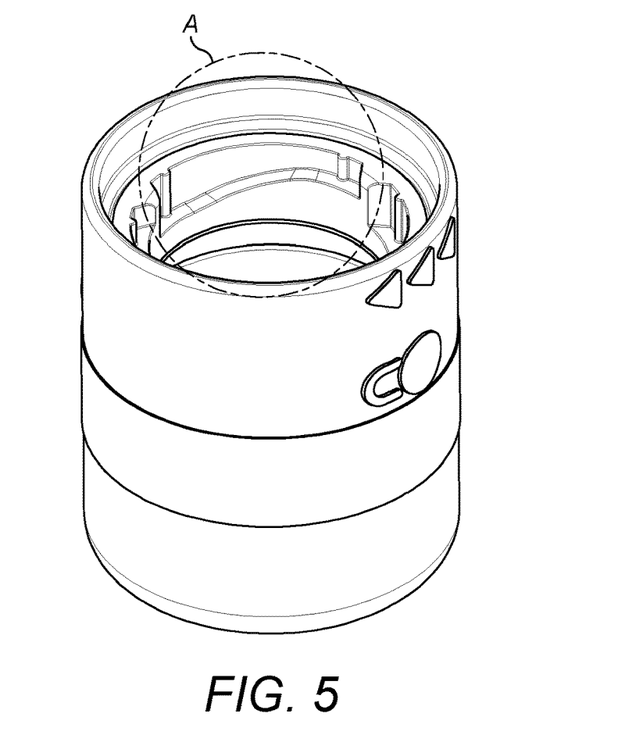
FIG. 5 is a perspective view of the housing and cartridge from one end.
Figure 5A:
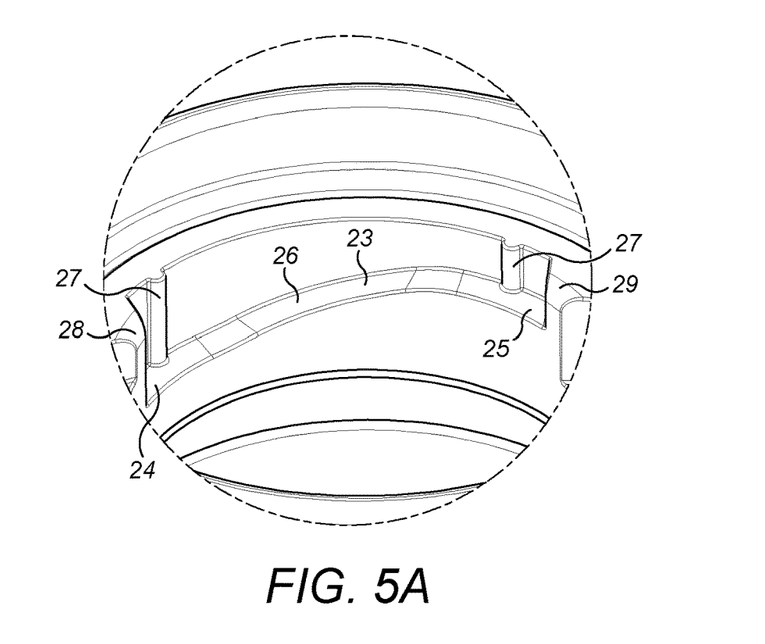
FIG. 5A shows the detail in circle A in FIG. 5.
Figure 6:
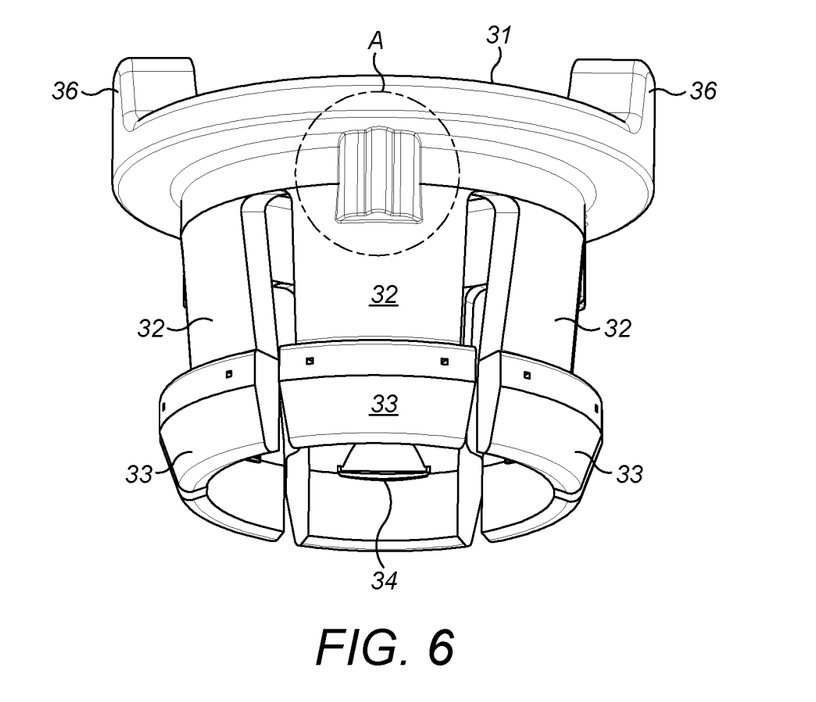
FIG. 6 is a perspective view of the collet from the second end.
Figure 6A:
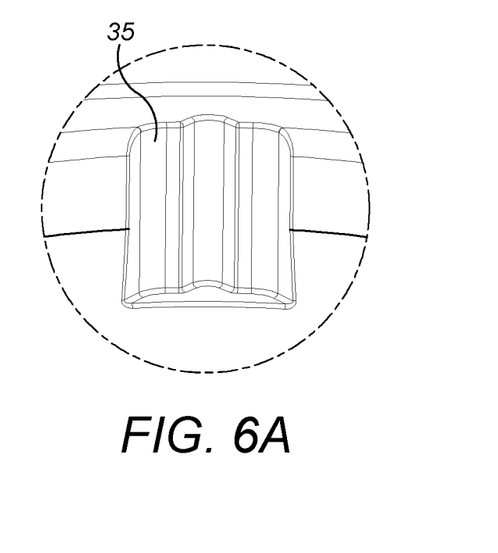
FIG. 6A shows the detail in circle A in FIG. 6.
Figure 7:
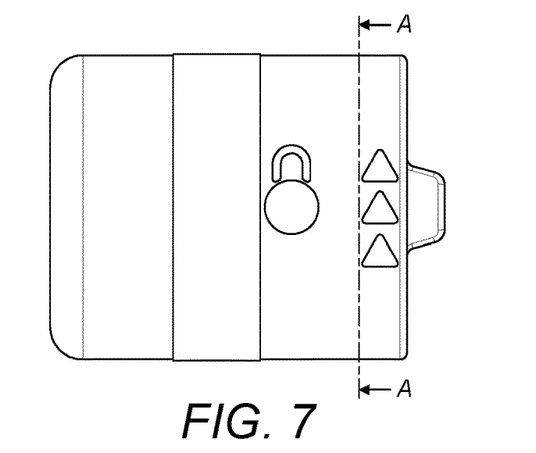
FIG. 7 is a side view of the end stop.
Figure 7A:
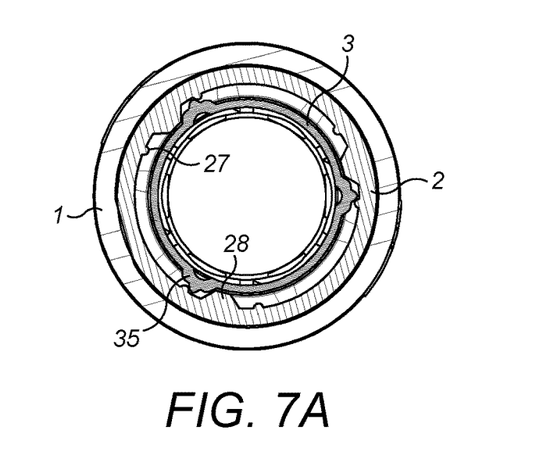
FIG. 7A is a cross section through line A-A in FIG. 7 in the unlocked position.

The operation of the collet 3 will now be described. The position shown in FIG. 7A is an unlocked position. In this position, the collet 3 has been rotated such that cam followers 35 abut the first end stops 28 such that the cam followers are at the low point 24 (FIG. 5A). In this position, the collet 3 has a relatively large degree of axial freedom as it can move to a position in which the heads 33 can be kept away from the tapered cam surface 22. If held in that position by a user, the tube T can be withdrawn because the heads 33 are kept away from the tapered cam surface 22 such that the collet cannot grip the tube.

Figure 7B:
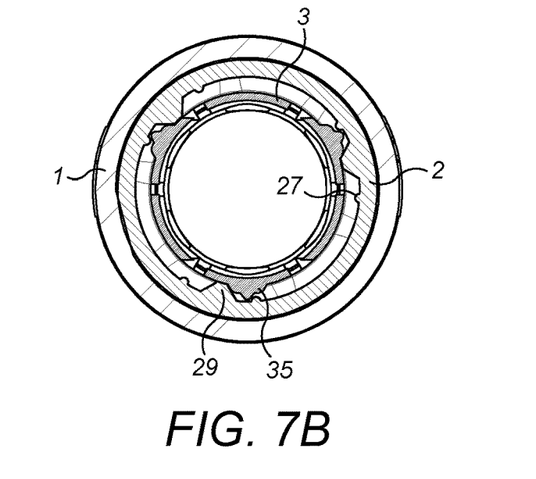
FIG. 7B is a cross section through line A-A in FIG. 7 in the locked position.

The collet 3 is then rotated into the locked position shown in FIG. 7B. In doing so, the followers 35 moves up the inclined faces 26, over the bumps 27, providing a tactile feel to the user that a position has been reached, and onto the high point 25 (FIG. 5A).

In the locked position shown in FIG. 7B, the collet has nothing like the same degree of freedom as in FIG. 7A so that it cannot be moved and held into an unlocked position where the teeth 34 disengage with the tube T.

The only way to remove the tube T in this locked configuration is for the user to grasp the tabs 36, rotate the collet 3 to the unlocked position, and manually hold the collet in the unlocked position while pulling the tube T out of the housing 1.

The tube T can be inserted with the collet 3 in the unlocked position as this allows for more scope for the arms 32 to be deflected upon insertion of the tube. However, even in the locked position, there can be a small clearance between the head 33 and the tapered cam surface 22. Thus, it is possible to insert the tube T with the collet in the locked position. This provides a simple assembly process. The user needs only to insert the tube into the collet. They do not need to concern themselves with the locking operation.

Figure 2:
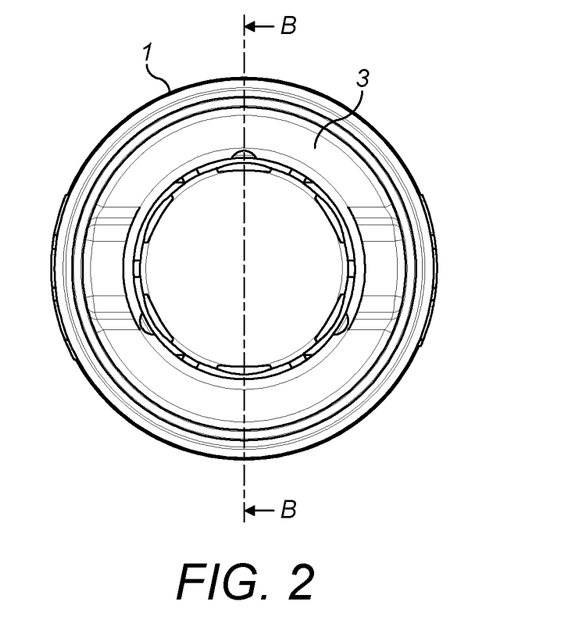
FIG. 2 is an end view of the end stop from one end.
Figure 2A:
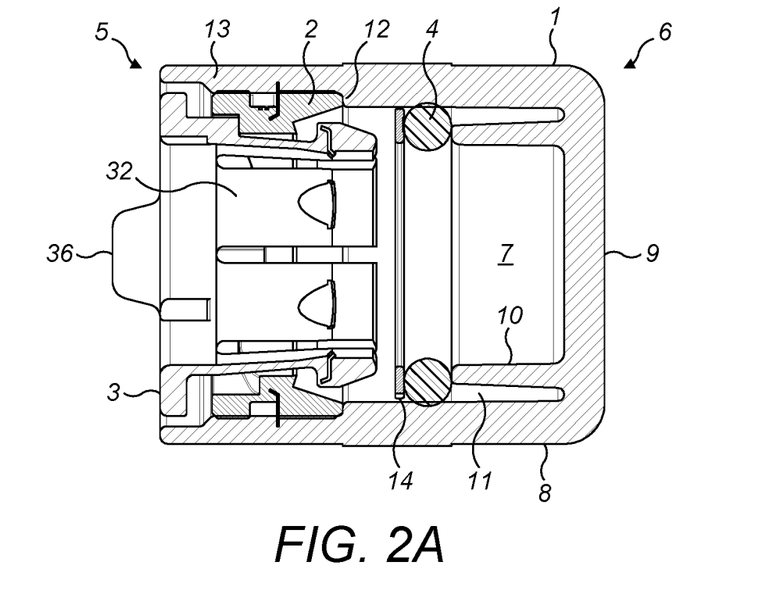
FIG. 2A is a cross section through line A-A in FIG. 2.

As can be best seen from FIGS. 2A and 3A, the collet ring 31 is axially set back inside the housing 1. However, the tabs 36 extend beyond the end of the housing 1. In this position, the collet 3 is protected from external impacts by the housing 1. Further, because it is recessed within housing 1, it is, to some extent, shielded from the soil in which the tubes are buried. With this end stop, the only points where dirt can potentially enter internal workings of the connector are between the collet ring 31 and the tube T and between the collet ring 31 and the housing 1. However, these are interfaces where tight tolerances can be applied. Further, because of the rotary action required to unlock the collet, even if some dirt does enter into these gaps, this is unlikely to jam the collet 3 in place as a rotary motion can readily generate sufficient torque to overcome any such sticking.

The tabs 36 have right angled corners. This allows them to be inserted into the cut end of a tube T and scraped around the inner edge of the tube to remove any burrs which are formed during the cutting operation. The edge may be shaped in a different way to provide more effective burr removal.

Figure 1A:
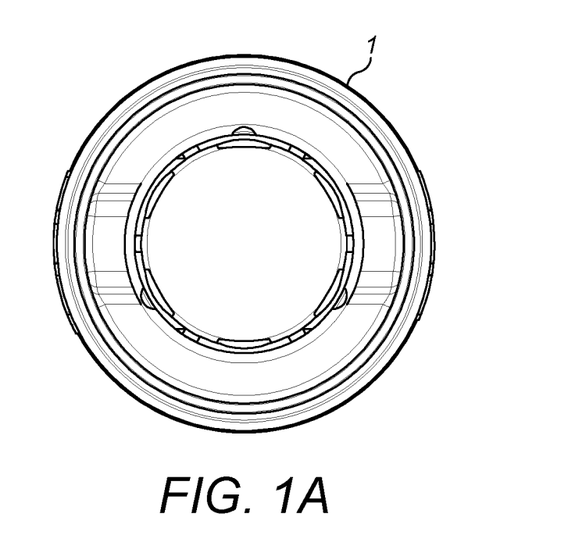
FIG. 1A is an end view of the end stop from one end.
Figure 1B:
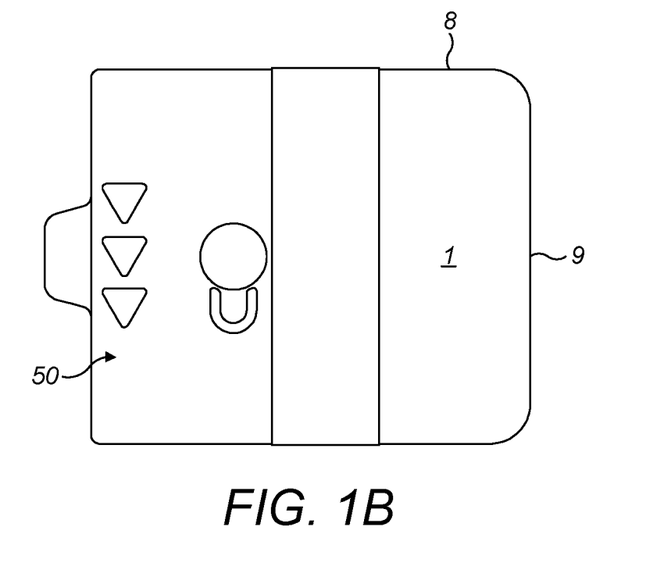
FIG. 1B is a side view of the end stop.
Figure 1C:
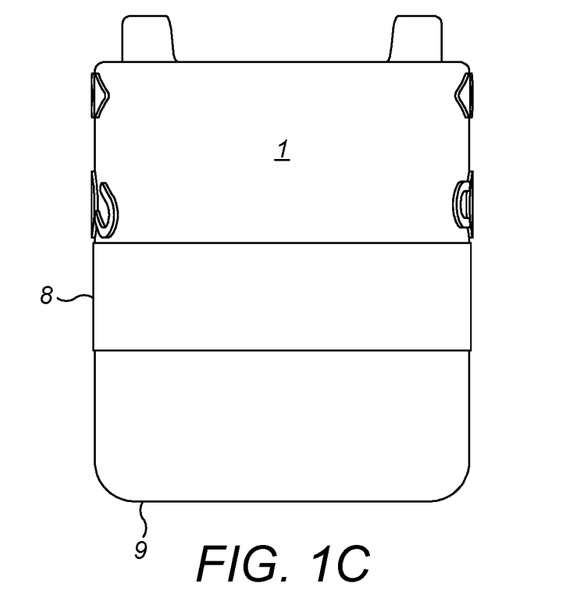
FIG. 1C is a plan view of the end stop.
Figure 1D:
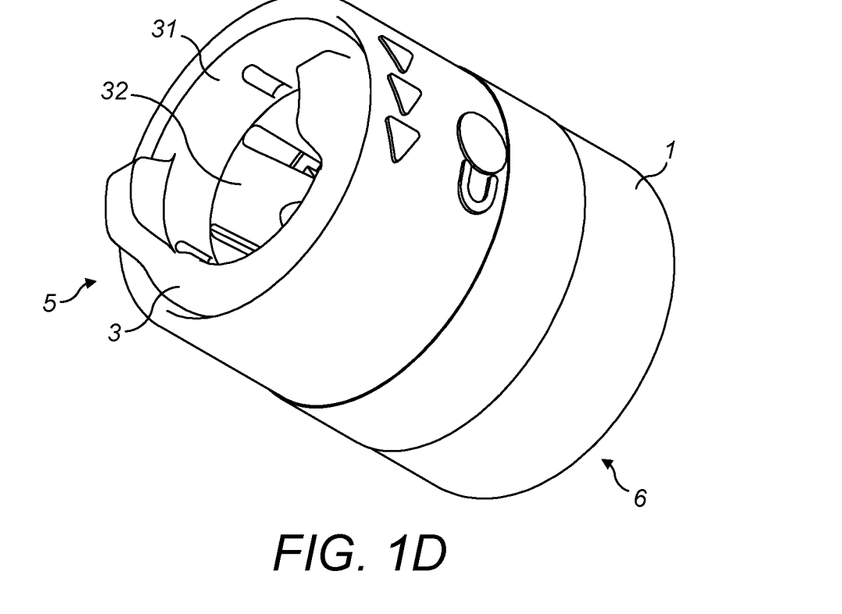
FIG. 1D is a perspective view from one end of the end stop.

The free end of a tube T which is not connected to an adjacent tube is inserted into the connector 1 until the end of the tube T abuts against the end wall 9 within the annular wall 10. The collet operates as described above to grip the tube. The user can visually verify that the tube is correctly in place and then simply rotate the collet ring 35 using the tabs 36 to lock the collet in place as described above. As shown, for example, in FIG. 1B, the housing 1 is provided with visual indicia 50 to provide a visual indication that the collet has been locked.

The invention claimed is:

1. An end stop for a fibre optic cable tube, the end stop comprising:
    a hollow cylindrical housing being open at an open end and closed at an opposite, closed end to define an internal cavity;
    a connector at one end for connection to the fibre optic cable tube:
    an annular seal within the housing to seal, in use, against an outer wall of the fibre optic cable tube inserted into the hollow cylindrical housing; and
    an annular wall spaced radially inwardly from a side wall of the hollow cylindrical housing thereby defining an air gap, the air gap being located between the side wall of the hollow cylindrical housing and the annular wall, the annular wall being upstanding from the closed end and extending towards the open end, an inner face of the annular wall being dimensioned to receive the fibre optic cable tube.

2. An end stop according to claim 1, wherein the annular wall and the hollow cylindrical housing at the closed end are transparent such that the presence of the fibre optic cable tube seated within the annular wall are seen externally of the hollow cylindrical housing.

3. An end stop according to claim 1, wherein the connector is a collet located in the open end of the hollow cylindrical housing, the collet having a collet ring, the collet ring having a plurality of flexible arms extending generally axially of the collet ring into the hollow cylindrical housing, the hollow cylindrical housing having a tapered surface convergent towards the open end and the plurality of flexible arms having heads at their distal ends for engaging both of the tapered surface and the fibre optic cable tube extending, in use, through the collet into the internal cavity of the hollow cylindrical housing, wherein the heads are compressed against the fibre optic cable tube by the tapered surface with outward movement of the collet with respect to of the hollow cylindrical housing to secure the fibre optic cable tube within the internal cavity.

4. An end stop according to claim 3, further comprising a collet lock formed on the collet, the collet having a locked rotary position to hold the collet in an outward tube securing position and an unlocked rotary position in which the collet can move axially with respect to the internal cavity for release and engagement of the fibre optic cable tube by the collet; wherein one of the housing and the collet is provided with a cam surface and the other of the housing and the collet is provided with a cam follower, the cam surface being configured to provide the locked and unlocked positions.

5. An end stop according to claim 4, wherein the cam surface is on the housing.

6. An end stop according to claim 4, wherein the housing includes a cartridge retained by a main housing portion, the cartridge being provided with the cam surface.

7. An end stop according to claim 3, wherein the collet ring does not protrude axially beyond the hollow cylindrical housing.

8. An end stop according to claim 4, wherein the collet ring is recessed into the housing.

9. An end stop according to claim 1, wherein the connector has a continuous outer surface of constant radius.

10. An end stop according to claim 1, wherein the connector is devoid of outer ribs.

11. An end stop for a fibre optic cable tube, the end stop comprising:
a housing having an open end and an opposite, closed end that together define an internal cavity;
a connector including a collet and a cartridge, the housing having a first internal annular shoulder for receiving the cartridge and a second annular shoulder adjacent the open end for receiving the collet, the cartridge having a plurality of flexible teeth; and
an annular seal within the housing to seal, in use, against an outer wall of the fibre optic cable tube inserted into the internal cavity of the housing;
wherein the housing includes an annular wall spaced radially inwardly from a side wall of the housing to define an air gap, the annular wall extending towards the open end of the housing, an inner face of the annular wall being dimensioned to receive the fibre optic cable tube.

12. The end stop according to claim 11, wherein the annular wall and the housing at the closed end are transparent such that the presence of the fibre optic cable tube seated within the annular wall are seen externally of the housing.

13. The end stop according to claim 11, wherein the collet has a collet ring, the collet ring having a plurality of flexible arms extending generally axially of the collet ring into the housing, distal ends of the plurality of flexible arms having respective heads.

14. The end stop according to claim 13, wherein the housing has a tapered surface convergent towards the open end and the respective heads engage both the tapered surface and the fibre optic cable tube extending, in use, through the collet into the internal cavity of the housing, wherein the heads are compressed against the fibre optic cable tube by the tapered surface with outward movement of the collet with respect to the housing to secure the tube within the internal cavity.

15. The end stop according to claim 14, further comprising a collet lock formed on the collet, the collet having a locked rotary position to hold the collet in an outward tube securing position and an unlocked rotary position in which the collet can move axially with respect to the internal cavity for release and engagement of the fibre optic cable tube by the collet, wherein one of the housing and the collet is provided with a cam surface and the other of the housing and the collet is provided with a cam follower, the cam surface being configured to provide the locked and unlocked positions.

16. The end stop according to claim 13, wherein the collet ring does not protrude axially beyond the housing.

17. The end stop according to claim 11, wherein the connector has a continuous outer surface of constant radius.

18. The end stop according to claim 11, wherein the connector is devoid of outer ribs.

19. A connector for use with an end stop for a fibre optic cable tube, the connector comprising:
a collet having a collet ring, the collet ring having a plurality of flexible arms extending generally axially of the collet ring, distal ends of the plurality of flexible arms having respective heads, the collet having a collet lock formed thereon, the collet having a locked rotary position to hold the collet in an outward securing position and an unlocked rotary position in which the collet can move axially; and
a cartridge having a plurality of flexible teeth.

20. The connector according to claim 19, wherein the end stop includes a housing with an annular wall spaced radially inwardly from a side wall of the housing to define an air gap, an inner face of the annular wall being dimensioned to receive the fibre optic cable tube.

* * * * *